United States Patent [19]

Choi

[11] Patent Number: 5,995,473
[45] Date of Patent: Nov. 30, 1999

[54] OPTICAL PICKUP SYSTEM CAPABLE OF SELECTIVELY READING A MULTIPLE NUMBER OF OPTICAL DISKS

[75] Inventor: Yang-Oh Choi, Seoul, Rep. of Korea

[73] Assignee: Daewoo Electronics Co., Ltd., Rep. of Korea

[21] Appl. No.: 08/898,156

[22] Filed: Jul. 22, 1997

[30] Foreign Application Priority Data

Jul. 31, 1996 [KR] Rep. of Korea .................. 96-31964

[51] Int. Cl.⁶ ............................................. G11B 7/00
[52] U.S. Cl. ............................................. 369/112; 369/118
[58] Field of Search .................. 369/109, 110, 369/112, 44.23, 94, 54, 58, 118, 120, 121

[56] References Cited

U.S. PATENT DOCUMENTS 5,526,338  6/1996  Hasman et al. .................. 369/112 X

FOREIGN PATENT DOCUMENTS 0747893  12/1996  European Pat. Off. .
9138967   6/1997  Japan .

*Primary Examiner*—Paul W. Huber
*Attorney, Agent, or Firm*—Anderson Kill & Olick

[57] ABSTRACT

An optical pickup system for selectively detects an information signal from, e.g., a pair of optical disks loaded on a disk tray, wherein each of the optical disks may have a different thickness. The optical pickup system includes a light source for generating a first and a second light beams having a different wavelength from each other, a first wavelength $\lambda_1$, and a second wavelength $\lambda_2$, and a beam splitter provided with a first and a second parts, wherein the first light beam impinging onto the first part is partially reflected to the first optical disk, and the second light beam impinging onto the second part is partially reflected to the second optical disk, thereby allowing the optical pickup system to detect an information signal from the respective optical disks.

14 Claims, 6 Drawing Sheets

5,995,473

OPTICAL PICKUP SYSTEM CAPABLE OF SELECTIVELY READING A MULTIPLE NUMBER OF OPTICAL DISKS

FIELD OF THE INVENTION

The present invention relates to an optical pickup system; and, more particularly, to an improved optical pickup system capable of reading a multiple number of optical disks loaded on a disk tray.

DESCRIPTION OF THE PRIOR ART

In FIG. 1, there is shown an optical head 100 for reproducing information signals stored on a thin and a thick optical disks alternatively loaded on a disk tray, wherein each of the optical disks has a corresponding recording surface, disclosed in a copending commonly owned application, U.S. Ser. No. 08/706,305, now U.S. Pat. No. 5,708,641, entitled "MULTIPLE FOCUS OPTICAL PICKUP SYSTEM", which is incorporated herein by reference. The optical head 100 includes: a light source 116 for generating a light beam, a beam splitter 106 provided with a surface, a collimate lens 108, the optical device 110 having a first part 111 and a second part 113, a cylindrical lens 104 and a detector 102 provided with a plurality of photoelectric cells.

In the system 100, when a thin optical disk 115 having a thickness of, e.g., 0.6 mm is loaded on the disk tray, the light passing through the second part 113 of the optical device 110 is utilized for reproducing the information signal off the recording surface 112 of the thin optical disk 115. In this case, the light beam emitted from the light source 116, e.g., a laser diode, enters the optical device 110 after first being partially reflected from the surface of the beam splitter 106 and then being collimated through the collimate lens 108. In such a case the second part 113 of the optical device 110 plays the role of an object lens by focusing the collimated parallel light beam onto the recording surface 112 of the thin optical disk 115. The light beam reflected from the recording surface 112 is first transmitted through the optical device 110 and the collimate lens 108 thereafter and then is partially transmitted through the beam splitter 106 for converging on the detector 102, wherein the beam splitter 106 is disposed between the collimate lens 108 and the detector 102. The surface of the beam splitter 106 is capable of partially reflecting and partially transmitting the light beam impinging thereon. The light beam transmitted through the beam splitter 106 becomes astigmatic after passing through the cylindrical lens 104, thereby allowing the detector 102 to read the information signal, e.g., a focusing error signal, off the recording surface 112 of the thin optical disk 115 by using an astigmatic method. The cylindrical lens 104 is disposed between the beam splitter 106 and the detector 102.

Alternatively, when a thick optical disk 117 having a thickness of, e.g., 1.2 mm is loaded on the disk tray, the light passing through the first part 111 of the optical device 110 is utilized for reproducing the information signal off the recording surface 114 of the thick optical disk 117, wherein the information signal will be read at the detector 102 after being reflected from the recording surface 114 and then being transmitted through the first part 111 of the optical device 110, the collimate lens 108, the beam splitter 106 and then the cylindrical lens 104. In this case the first part 111 of the optical device 110 as in the second part 113 for the case of a thin optical disk, plays the role of an object lens by focusing the parallel light beam passing therethrough onto the recording surface 114 of the thick optical disk 117.

One of the major shortcomings of the above-described optical head 100 is the large size thereof, arising from the use of the optical device 110, which, in turn, requires the collimate lens 108 to make the light beam from the beam splitter 106 to be parallel, thereby making the optical head 100 bulky and structurally complicated.

Further, the complicated configuration of the prior optical device 110 makes its manufacturing process complex.

SUMMARY OF THE INVENTION

It is, therefore, a primary object of the present invention to provide an improved optical pickup system having a simpler structure and still being capable of reading a plurality of optical disks having various thicknesses.

In accordance with the present invention, there is provided an optical pickup system having the capability of selectively reading one of N optical disks loaded on a disk tray, wherein each of the optical disks has a recording surface and a thickness different from each other, N being a positive integer, the optical pickup system comprising: a light source for generating a plurality of light beams, wherein each light beam is to be used for an optical disk of a predetermined thickness corresponding thereto; optical means including a plurality of parts, wherein each part of the optical means partially reflects a corresponding light beam to the recording surface of the loaded optical disk while the remaining parts of the optical means completely transmit the corresponding light beam impinging thereon; an objective lens for focusing the light beam reflected from the corresponding part of the optical means on the recording surface of the loaded optical disk; a cylindrical lens for making astigmatic the light beam, reflected from the recording surface of the loaded optical disk via the objective lens and the optical means, passing therethrough; and a detector for detecting the intensity of the light beam incident thereon, thereby allowing the optical pickup system to read information signals off the recording surface of the loaded optical disk.

BRIEF DESCRIPTION OF THE DRAWINGS

The present invention together with the above and other objects and advantages will become apparent from the following description of preferred embodiments, when read in conjunction with the accompanying drawings, wherein.

DETAILED DESCRIPTION OF THE PREFERRED EMBODIMENTS

There are illustrated in FIGS. 2 to 6 various views of the inventive optical pickup system and beam spots on the detecting surface in accordance with a preferred embodiment of the present invention.

Figure 1:
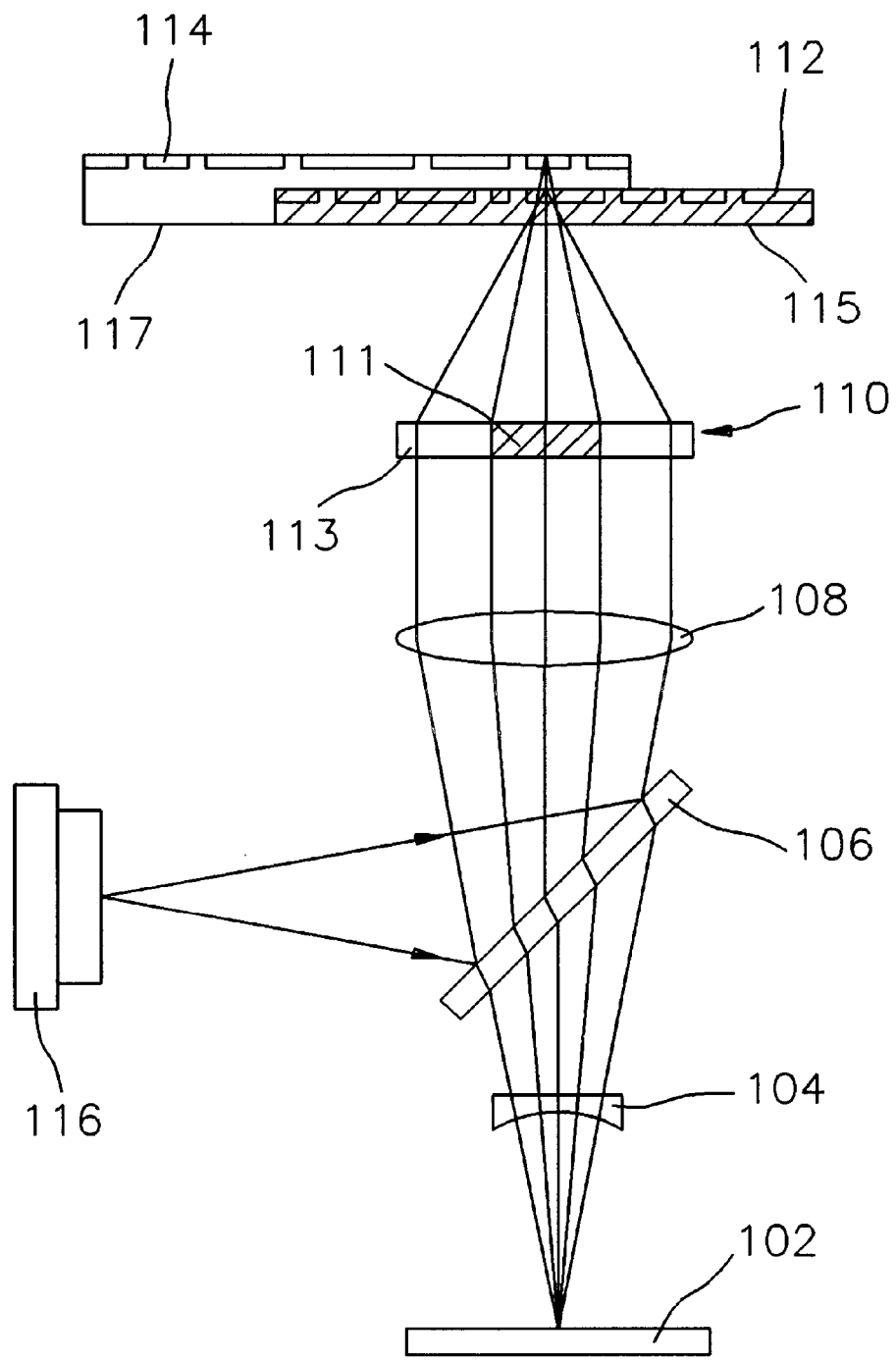
FIG. 1 represents a schematic side view of a prior art optical head.
Figure 2:
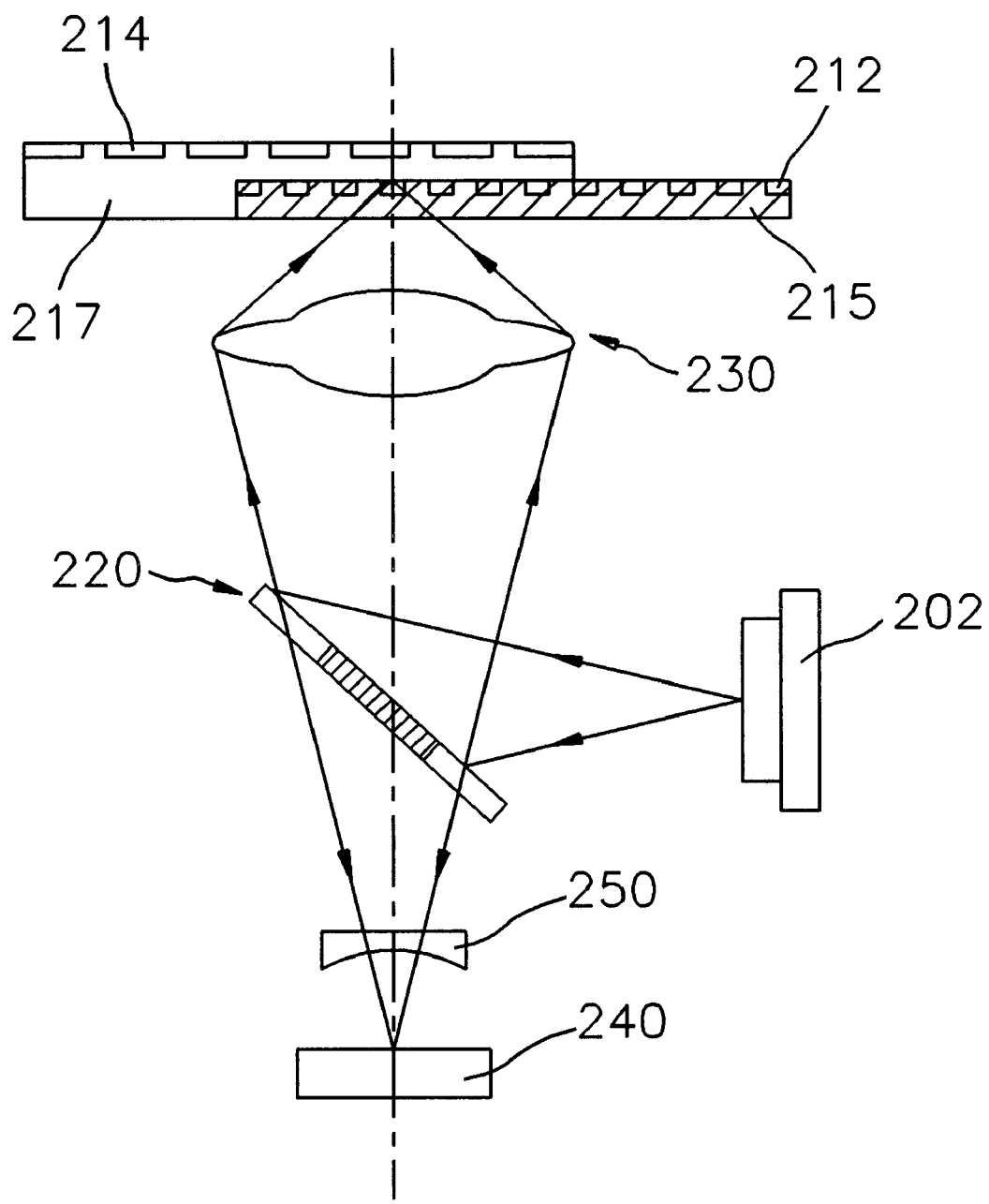
FIG. 2 exhibits a schematic side view of an optical pickup system utilizing the inventive beam splitter.

As shown in FIG. 2, the optical pickup system 200 in accordance with the present invention comprises a light source 202, e.g., a wavelength-tunable semiconductor laser, for selectively generating either a first or a second light beam, the two light beams having wavelengths different from each other, a first wavelength $\lambda_1$, and a second wavelength $\lambda_2$, respectively, a beam splitter 220, an objective lens 230, a cylindrical lens 250 and a detector 240 provided with a plurality of reception surfaces.

In the system 200, if one of the optical disks 215, 217 is selected to be loaded on a disk tray, the light source 202 generates either one of the first and the second light beams depending on the thickness of the selected optical disk. The selected light beam emitted from the light source 202 enters the objective lens 230 after being reflected from the surface of the beam splitter 220 which partially reflects and partially transmits beams impinging thereon, wherein the surface of the beam splitter 220 is so arranged to be inclined at a predetermined angle with respect to an optical axis formed by a central point of the detector 240 and the focal point of the objective lens 230. It is preferable that the predetermined angle be 45 degrees. The detector 240 is placed at a position opposite the selected optical disk with respect to the objective lens 230. The objective lens 230 focuses the selected light beam reflected from the beam splitter 220 on the recording surface of the selected optical disk and also converges the selected light beam reflected from the recording surface of the selected optical disk after first being partially transmitted through the beam splitter 220 and then transmitted through the cylindrical lens 250 on the detector 240. The selected light beam reflected from the selected optical disk, after passing through the objective lens 230 and the beam splitter 220, becomes astigmatic by passing through the cylindrical lens 250, thereby allowing the detector 240 to read the information signal off the recording surface of the selected optical disk by employing the astigmatic method.

Figure 3:
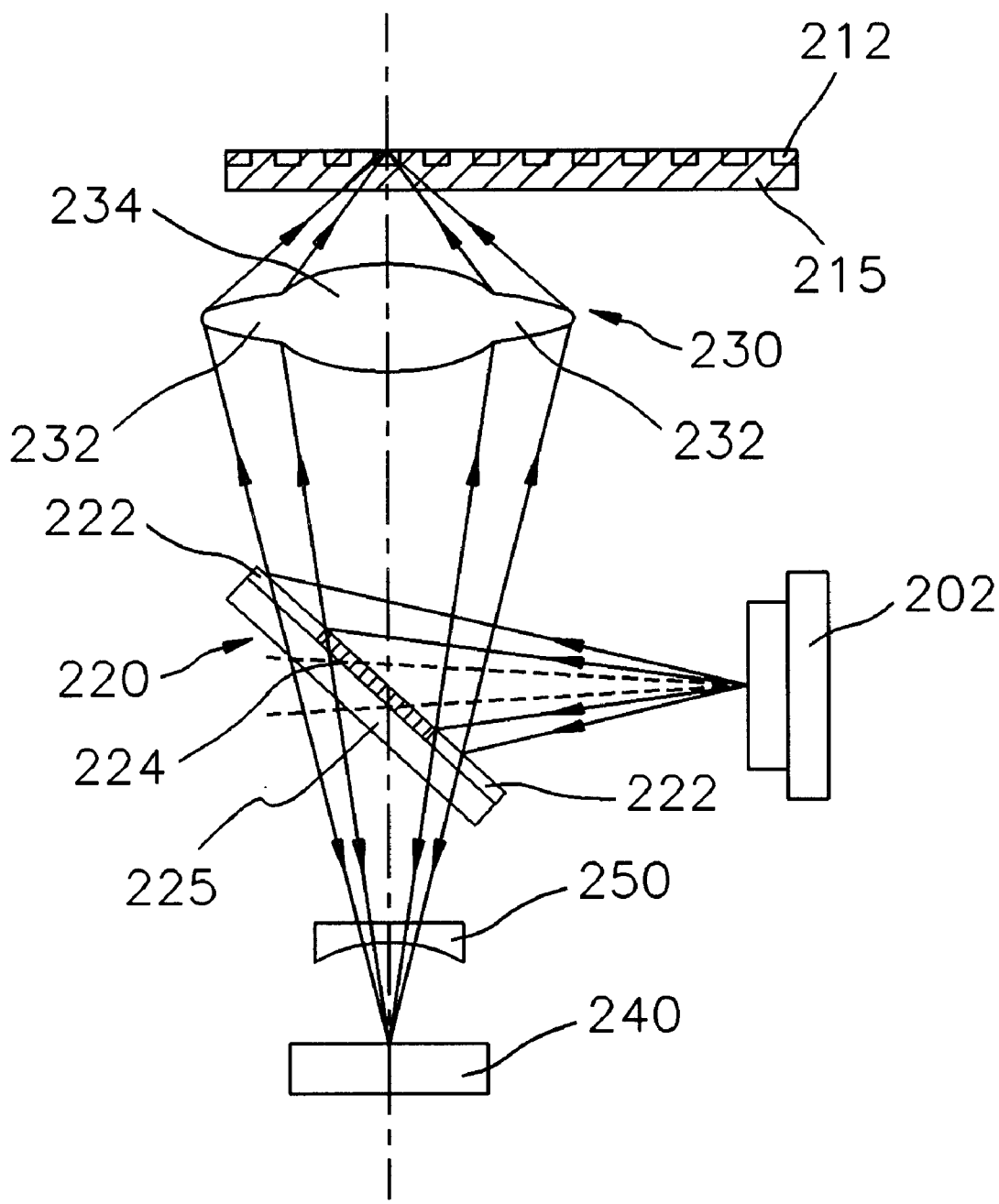
FIG. 3 depicts a detailed view showing the construction of the beam splitter and the objective lens shown in FIG. 2, when a thin optical disk is loaded on a disk tray.

In FIG. 3, there is shown a detailed view showing the construction of the beam splitter 220 and the objective lens 230 shown in FIG. 2, when a thin, e.g., 0.6 mm, optical disk 215 is loaded on the disk tray.

In reproducing an information signal recorded on the recording surface 212 of the thin optical disk 215, the light source 202 generates the first light beam, having the first wavelength $\lambda_1$. In FIG. 3, solid lines represent optical paths of the first light beam impinging onto the first part 222 of the beam splitter 220 and dotted lines represent the first light beam impinging onto the second part 224 of the beam splitter 220. In this case, the beam splitter 220 includes a base 225 transparent to the light beam emitted from the light source 202, a first and a second parts 222, 224, wherein the first part 222 is in the form of an annular disk surrounding the second part 224 of a disk form. The reflection surface of the first part 222 is coated with a first dielectric film capable of partially reflecting only the first light beam emitted from the light source 202, whereas the reflection surface of the second part 224 is coated with a second dielectric film capable of partially reflecting only the second light beam having the second wavelength $\lambda_2$, but totally transmitting the all the other light beams impinging thereon. It should be noted that each of the dielectric films may be made of a stack of layers, wherein the stack of layers can be made by stacking high refraction index layers and low refraction index layers alternately and the thickness of each layer is ¼ of the wavelength. The first part 222 partially reflects the first light beam having the first wavelength $\lambda_1$ to the objective lens 230 and transmits all the other light beams having different wavelengths. The objective lens 230 includes a first division 232 and a second division 234, wherein the numerical aperture of the first division 232 is larger than that of the second division 234. Further, the first division 232 of the objective lens 230 is designed for focusing the light beam impinging thereon onto the recording surface 212 of the thin optical disk 215. The first light beam reflected from the first part 222 is focused on the recording surface 212 of the optical disk 215 through the first division 232 of the objective lens 230. Since the first light beam impinging onto the second part 224 of the beam splitter 220 transmits completely therethrough, it cannot be used to read the information signal off the recording surface 212 of the thin optical disk 215. The first division 232 of the objective lens 230 converges the light beam reflected from the recording surface 212 on the detector 240, wherein the light beam, after being transmitted through the objective lens 230, is further transmitted through the first part 222 of the beam splitter 220 and the cylindrical lens 250, both being disposed between the objective lens 230 and the detector 240 in that order, before it being focused on the detector 240.

Figure 4A:
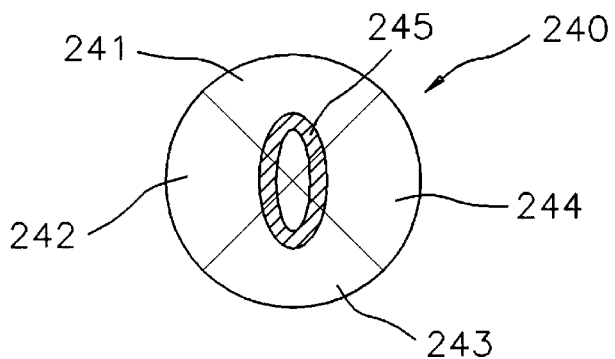
FIGS. 4A to 4C exemplify beam spots formed on the reception surfaces of the detector when the thin optical disk is loaded on the disk tray.
Figure 4B:
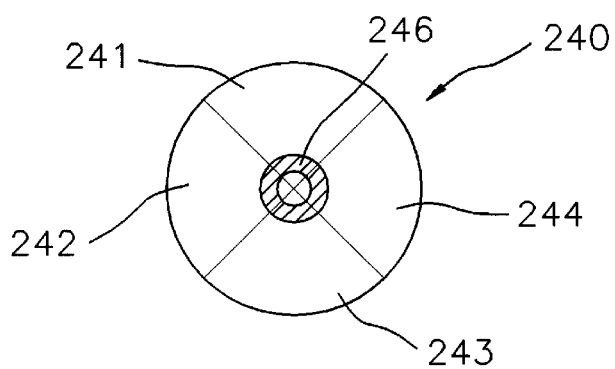
Figure 4C:
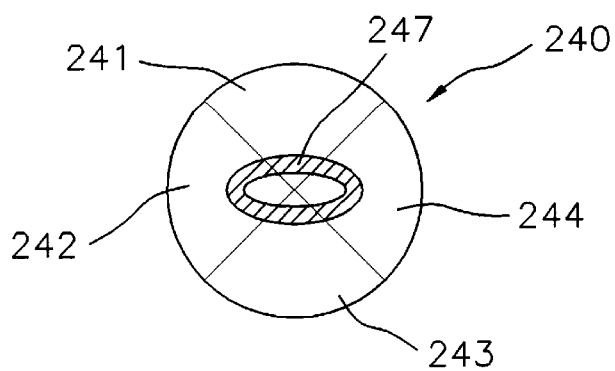

In FIGS. 4A to 4C, there are exemplified beam spots formed on reception surfaces 241, 242, 243, 244 of the detector 240 when the thin optical disk 215 is loaded on the disk tray.

When the thin optical disk 215 moves toward the objective lens 230 from the focal point of the first division 232 of the objective lens 230, the first light beam which is in the form of an annular shape impinges onto the quadrant reception surfaces 241, 242, 243, 244 in a vertically elongated shape as shown in FIG. 4A, wherein the size of the beam spot 245 represents the intensity of the first light beam impinging thereon. Accordingly, the beam intensities on the reception surfaces 241 and 243 become larger, and those of the reception surfaces 242 and 244 become smaller. A focusing error signal is obtained by subtracting the sum of the intensities on the reception surfaces 241 and 243 from the sum of the intensities on the reception surfaces 242 and 244, thereby allowing a signal detection unit(not shown) to generate the focusing error signal whose magnitude is a positive value representing the subtraction result obtained above. When the thin optical disk 215 is located precisely at the focal point of the first division 232 of the objective lens 230, the first light beam impinges onto the quadrant reception surfaces 241, 242, 243, 244 in an annular shape as represented in FIG. 4B. The beam intensities on the quadrant reception surfaces 241, 242, 243, 244 are equal to each other, and the signal detection unit(not shown) generates the focusing error signal of zero magnitude. When the thin optical disk 215 moves from the focal point of the objective lens 230 further away from the first division 232 of the objective lens 230, the first light beam which is in the form of an annular shape impinges onto the quadrant reception surfaces 241, 242, 243, 244 in a horizontally elongated shape as illustrated in FIG. 4C. The beam intensities on the reception surfaces 241 and 243 are smaller than those on the reception surfaces 242 and 244, and the signal detection unit generates the focusing error signal whose magnitude is a negative value representing the result of subtracting the sum of the beam intensities on the reception surfaces 241 and 243 from the sum of the beam intensities on the reception surfaces 242 and 244.

Figure 5:
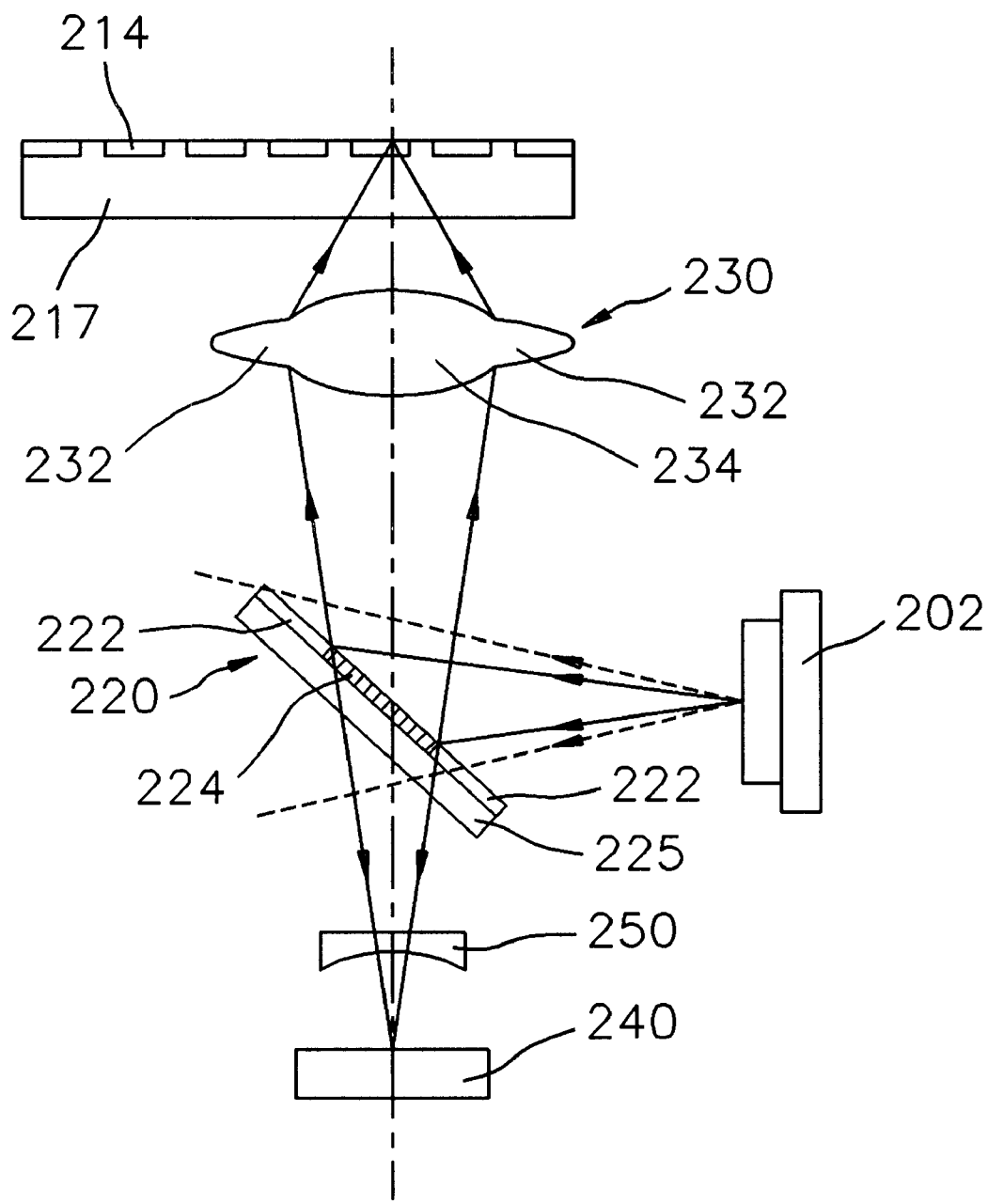
FIG. 5 provides a detailed view showing the construction of the beam splitter and the objective lens shown in FIG. 2, when a thick optical disk is loaded on the disk tray.

On the other hand, in reproducing an information signal recorded on the recording surface 214 of the thick, e.g., 1.2 mm, optical disk 217, the light source 202 generates the second light beam, having the second wavelength $\lambda_2$. In FIG. 5, solid lines represent optical paths of the second light beam impinging onto the second part 224 of the beam splitter 220 and dotted lines represent the second light beam impinging onto the first part 222 of the beam splitter 220. In this case, the reflection surface of the second part 224 of the beam splitter 220 partially reflects only the second light beam having the second wavelength $\lambda_2$ to the second division 234 of the objective lens 230 and transmits all the other light beams having different wavelengths impinging thereon, wherein the second light beam impinging onto the reflection surface of the first part 222 does not contributed to read the information signal off the recording surface 214 of the thick optical disk 217, since the second light beam impinging onto the reflection surface of the first part 222 passes completely therethrough without any reflecting. The second light beam reflected from the second part 224 of the beam splitter 220 impinges onto the second division 234 of the objective lens 230 which is designed to focus the light beam impinging thereon onto the recording surface 214 of the thick optical disk 217. The second division 234 of the objective lens 230 converges the second light beam reflected from the recording surface 214 of the thick optical disk 217 on the detector 240, wherein the second light beam, after being transmitted through the objective lens 230, is further transmitted through the second part 224 of the beam splitter 220 and the cylindrical lens 250 before impinging onto the detector 240.

Figure 6A:
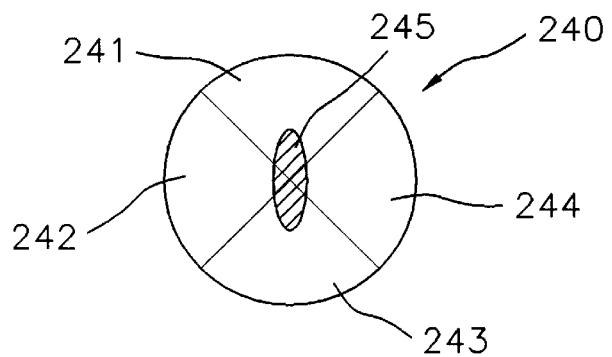
FIGS. 6A to 6C describe beam spots formed on the reception surfaces of the detector when the thick optical disk is loaded on the disk tray.
Figure 6B:
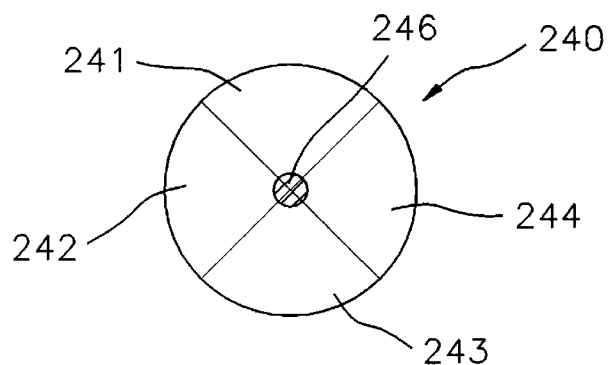
Figure 6C:
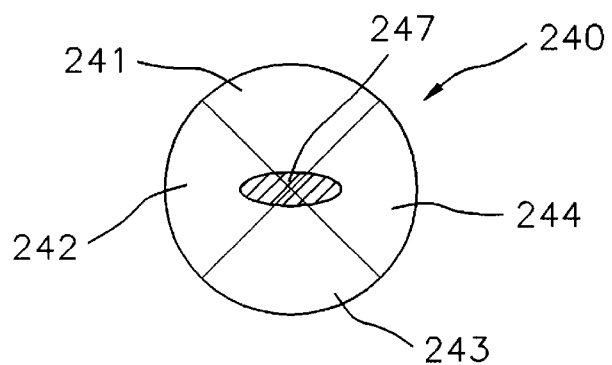

In FIGS. 6A to 6C, there are exemplified beam spots formed on the reception surfaces 241, 242, 243, 244 of the detector 240 when the thick optical disk 217 is loaded on the disk tray.

When the thick optical disk 217 is moving toward the objective lens 230 from the focal point of the second division 234 of the objective lens 230, the second light beam impinges onto the quadrant reception surfaces 241, 242, 243, 244, in a vertically elongated shape as shown in FIG. 6A, wherein the size of the beam spot 245 represents the beam intensity of the second light beam impinging thereon. The beam intensities on the reception surfaces 241 and 243 become larger than those of the reception surfaces 242 and 244. The focusing error signal is obtained by subtracting the sum of the beam intensities on the reception surfaces 241 and 243 from the sum of those on the reception surfaces 242 and 244, and the signal detection unit(not shown) generates the focusing error signal whose magnitude is a positive value representing the subtraction result obtained above. When the thick optical disk 217 is located precisely on the focal point of the second division 234 of the objective lens 230, the second light beam impinges onto the quadrant reception surfaces 241, 242, 243, 244, in a circular disk shape as represented in FIG. 6B. The beam intensities on the quadrant reception surfaces 241, 242, 243, 244 are equal to each other, and the signal detection unit(not shown) generates a focusing error signal of zero value. When the thick optical disk 217 moves from the focal point of the objective lens 230 further away from the second division 234 of the objective lens 230, the first light beam impinges onto the quadrant reception surfaces 241, 242, 243, 244 in a horizontally elongated shape as illustrated in FIG. 6C. The beam intensities on the reception surfaces 241 and 243 are smaller than those on the reception surfaces 242 and 244, and the signal detection unit generates the focusing error signal whose magnitude is a negative value representing the subtraction of the sum of the beam intensities on the reception surfaces 241 and 243 from the sum of the beam intensities on the reception surfaces 242 and 244.

In comparison with the prior art optical head 100, the inventive optical pickup system 200 is structurally simple, its size being significantly reduced with fewer components, eliminating the optical device 110 in the prior optical head 100.

Even though the present invention has been described for an optical pick system having a light source capable of selectively generating either one of two light beams, each of the light beams having a different wavelength from each other and hence capable of reading information recorded on either one of a thin and a thick optical disks, selectively, the idea presented above can be extended to an optical pickup system for use with a thin and a thick optical disks, by utilizing therein, e.g., a light source capable of selectively generating a P and an S polarizations.

While the present invention has been described with respect to the preferred embodiments, other modifications and variations may be made without departing from the spirit and scope of the present invention as set forth in the following claims.

What is claimed is:

1. An optical pickup system having the capability of selectively reading one of N optical disks loaded on a disk tray, wherein each of the optical disks has a recording surface and a thickness different from each other, N being a positive integer, the optical pickup system comprising:

means for generating a plurality of light beams, wherein one of the light beams is to be used for a loaded optical disk of a predetermined thickness corresponding thereto; and optical means including a plurality of parts, wherein one part of the optical means partially reflects the one light beam to the recording surface of the loaded optical disk while the remaining parts of the optical means completely transmit the one light beam impinging thereon.

2. The optical pickup system of claim 1, further comprising means for focusing the light beam reflected from the one part of the optical means on the recording surface of the loaded optical disk.

3. The optical pickup system of claim 2, further comprising means for detecting the intensity of a light beam incident thereon.

4. The optical pickup system of claim 3, wherein the optical means is arranged in such a way that it is inclined at a predetermined angle with respect to an optical axis formed by a central point of the detecting means and a focal point of the focusing means.

5. The optical pickup system of claim 4, wherein the predetermined angle is 45 degrees.

6. The optical pickup system of claim 4, further comprising a cylindrical lens for making a light beam passing therethrough astigmatic.

7. The optical pickup system of claim 3, wherein said detection means has a quadrant of reception surfaces.

8. The optical pickup system of claim 3, wherein the light beam reflected from the recording surface of the loaded optical disk is transmitted through the one part of the optical means to the detection means to thereby allow the optical pickup system to read information signals off the recording surface of the loaded optical disk.

9. The optical pickup system of claim 3, wherein the optical means is disposed between an objective lens and the detection means.

10. The optical pickup system of claim 2, wherein said N is two.

11. The optical pickup system of claim 10, wherein the focusing means includes first and second divisions.

12. The optical pickup system of claim 11, wherein if the loaded optical disk is of a thickness of 0.6 mm, the one part of the optical means is in the form of an annular disk.

13. The optical pickup system of claim 12, wherein the light beam passing through the one part of the optical means impinges onto the first division of the focusing means.

14. The optical pickup system of claim 13, wherein the first division of the focusing means focuses the light beam impinging thereon onto the loaded 0.6 mm optical disk.

* * * * *